Jan. 14, 1930.  R. J. WENSLEY ET AL  1,743,175
TRAFFIC SUPERVISOR
Filed July 3, 1926
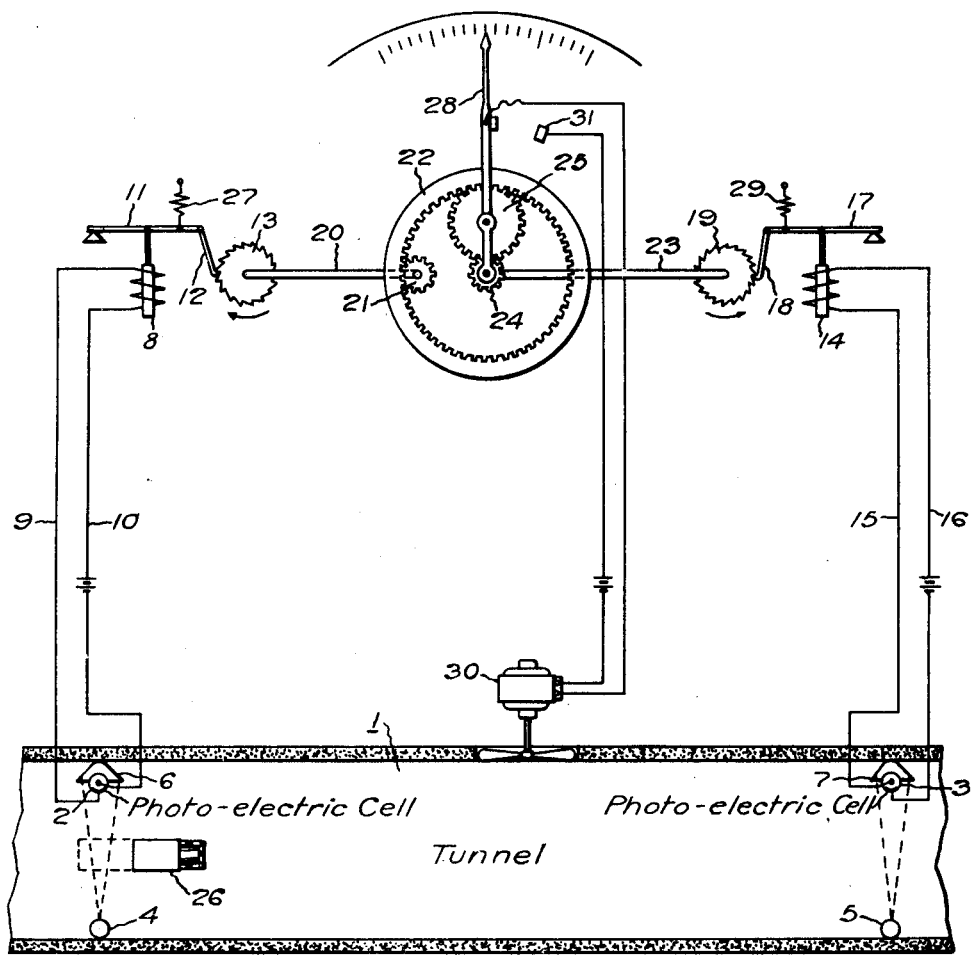
WITNESSES:
G. S. Neilson
Samuel Ostrolenk
INVENTORS
Roy J. Wensley and
Vladimir Zworykin.
BY
Wesley G. Carr
ATTORNEY Patented Jan. 14, 1930

1,743,175

UNITED STATES PATENT OFFICE

ROY J. WENSLEY, OF EDGEWOOD, AND VLADIMIR K. ZWORYKIN, OF SWISSVALE, PENNSYLVANIA, ASSIGNORS TO WESTINGHOUSE ELECTRIC AND MANUFACTURING COMPANY, A CORPORATION OF PENNSYLVANIA

TRAFFIC SUPERVISOR

Application filed July 3, 1926. Serial No. 120,486.

Our invention relates to electrical systems and more particularly to counting systems for supervising traffic.

An object of our invention is to provide photo-electric means for counting devices.

Another object of our invention is to provide means for counting the number of cars which pass by any point.

Another object of our invention is to provide means for indicating the number of cars in a tunnel at any one time.

There are other objects of our invention which, together with the foregoing, will appear in the specification which follows.

In practicing our invention, we provide a photo-electric cell exposed to a source of light so arranged that a counting device is operated proportional to the number of devices which pass before the photo-electric cell.

The single figure of the accompanying drawing is a diagrammatic view of our invention.

The tunnel 1 is provided with a photo-electric cell 2 at its entrance and a photo-electric cell 3 at its exit point. The photo-electric cell 2 is exposed to a source of light 4 and the photo-electric cell 3 is exposed to a source of light 5. The reflectors 6 and 7 concentrate these beams of light upon the respective cell.

A relay 8 is connected by the conductors 9 and 10 to the photo-electric cell 2 and operates the pawl and ratchet 12 and 13 through its armature 11. Similarly the relay 14 is electrically connected, by means of conductors 15 and 16, to the photo-electric cell 3 and operates the pawl and ratchet 18 and 19 through its armature 17.

A shaft 20 connects the ratchet 13 with a gear member 21 which meshes with a gear wheel 22. The ratchet wheel 19 is connected, by means of a shaft 23, to the gear wheel 24 which meshes with the gear wheel 25. The gear wheels 21, 22, 24 and 25 are in a differential arrangement.

As a device, such as the automobile 26, enters the tunnel the light 4 to which the photo-electric cell 2 is exposed, is cut off from the cell. As a result, the value of current in the conductors 9 and 10 is reduced to a small value, it being understood, of course, that the photo-electric cell varies the amount of electricity in the circuit in proportion to the amount of light to which it is exposed.

By reason of the drop of current in the line, the relay 8 will be deenergized and the spring 27 will pull back its armature and through it operate the pawl 12 to move the ratchet wheel 13 one step in a clockwise direction. As a result, the gear 21 will turn the gear wheel 22 one step clockwise which, in turn, will cause the gear wheel 25 to follow the movement of the gear wheel 22 and turn its pointer 28 one point to the right. The center of the gear wheel 25, it should be understood, is not stationary, but revolves about the center of gear 24. The action of the differential gear, as well as the photo-electric cell, is well known in the art and need not be described here.

Similarly, each time a device, such as the automobile 26, passes out of the exit of the tunnel, it will cut off the light 5 from the photo-electric cell 3. The current in the conductors 15 and 16 will be diminished as a result and the relay 14 will be deenergized. A spring 29 will thereupon operate the armature 17 and through it the pawl 18, to turn the ratchet 19 one step in a counter-clockwise direction.

This will turn the gear wheel 24 in a counter-clockwise direction to turn the indicator 28 to the left one step. Movement of the indicator 28 to the right thus counts up the number of cars which are in the tunnel, while the movement to the left subtracts as the cars leave the tunnel. The position of the indicator 28 therefore at any time will indicate the number of cars that are in the tunnel. The gear ratios are so designed that a unit movement of gear 21 rotates the indicator the same angle as a unit movement of gear 24.

A fan 30 is shown electrically connected to a contact 31 and is automatically started into operation in order to maintain the correct proportion of fresh air in the tunnel and shows a certain predetermined number of cars are in the tunnel.

It is understood, of course, that the photo-electric cells with individual differential gear arrangements can be placed throughout the tube in order to indicate the number of cars at any one point in the tunnel at any time. This would enable the detection of a jam caused by the breakdown of a car or for any other reason, at any point in the tunnel.

Although we have disclosed our invention as applied to a particular use, it is understood, of course, that it has many other and more varied uses and we do not intend to limit ourselves to the above specific application.

We claim as our invention:

1. In a system for controlling the ventilation of a tunnel traversed by motor vehicles, in combination, a motor-driven fan for said tunnel, a plurality of vehicle-actuated means located at spaced points in the tunnel, means controlled by said plurality of vehicle-actuated means for effecting energization of the fan motor when the number of vehicles between said spaced points exceeds a predetermined number.

2. In a system for controlling the ventilation in a tunnel traversed by motor vehicles, in combination, a motor-driven fan for said tunnel, and means for controlling the energization of said fan motor comprising a means responsive to the number of vehicles passing a predetermined point in said tunnel, a second means responsive to the number of vehicles passing a second predetermined point spaced from the first point, a differential device associated with said two means for determining the number of vehicles located between the two points, and means including an electric circuit connected to said fan motor and actuated by said differential device for energizing said motor when the number of vehicles between said points reaches a predetermined number.

3. In a system for controlling the ventilation of a tunnel traversed by motor vehicles; in combination, a ventilating means for said tunnel, and means for controlling the energization of said ventilating means directly in accordance with the number of vehicles in said tunnel, said energization-controlling means embodying a plurality of light-sensitive cells and cooperating light sources located at spaced points in said tunnel, a plural-ratchet-and-differential-gear mechanism controlled by the plurality of light-sensitive cells, and electrical contact devices connected to a circuit including said ventilating means and caused to engage each other when the number of vehicles between said spaced points in the tunnel exceeds a predetermined number.

In testimony whereof, we have hereunto subscribed our names this 24th day of June, 1926.

ROY J. WENSLEY.
VLADIMIR K. ZWORYKIN.